United States Patent [19]

Andrews

[11] Patent Number: 5,204,694
[45] Date of Patent: Apr. 20, 1993

[54] ROS PRINTER INCORPORATING A VARIABLE WAVELENGTH LASER

[75] Inventor: John R. Andrews, Fairport, N.Y.
[73] Assignee: Xerox Corporation, Stamford, Conn.
[21] Appl. No.: 737,113
[22] Filed: Jul. 29, 1991
[51] Int. Cl.$^5$ ............................................. H04N 1/21
[52] U.S. Cl. ..................................... 346/108; 372/18; 372/20; 372/24
[58] Field of Search ..................... 346/108, 160, 76 L; 372/18, 20, 24

[56] References Cited

U.S. PATENT DOCUMENTS

| | | | |
|---|---|---|---|
| 3,992,692 | 11/1976 | White et al. | 372/24 |
| 4,250,465 | 2/1981 | Leib | 331/945 D |
| 4,349,847 | 9/1982 | Traino | 358/293 |
| 4,450,459 | 5/1984 | Turner et al. | 346/160 |
| 4,733,253 | 3/1988 | Daniele | 372/24 |
| 4,737,798 | 4/1988 | Lonis et al. | 346/108 |
| 5,121,398 | 6/1992 | Rao | 372/20 |

OTHER PUBLICATIONS

IEEE, J Quantum Electronics, Filinki and Skettrup, "Fast Dispersive Beam Deflectors and Modulators", vol. QE-18, No. 7, pp. 1059-1062 Jul., 1982.
Applied Physics Letters 54(2) Mittelstein et al. "Broadband Tunability of gain-flattened quantum well semiconductor lasers with an external grating", Mar. 20, 1989, pp. 1092-1094.
D. C. Hall et al., "Broadband long-wavelength operation (9700Å$\gtrsim\lambda\gtrsim$8700 Å) of Al$_y$ Ga$_{1-y}$ As-GaAs-In$_x$-Ga$_{1-x}$ As quantum well heterostructure lasers in an external grating cavity", Jun. 1989.
Xerox Disclosure Journal, Scifres & Burnham, "Semiconductor Quantum Well Window Lasers", pp. 383-387, vol. 10, No. 6, Nov./Dec. 1985.

Primary Examiner—Mark J. Reinhart

[57] ABSTRACT

A fully electronic, nonmechanical raster output scanner (ROS) digital printer for high resolution xerographic printing is enabled by combining a laser adapted to produce a variable wavelength output with a dispersive element such as a grating to present a raster scan at an image plane. In a preferred embodiment, a diode laser is positioned within a laser cavity whose length is designed as a function of the resolution required for the scanned image. The wavelength varying output is incident upon a high resolution grating which diffracts the radiation through a diffraction angle which varies according to the wavelength of the incident light. A scan lens is positioned between the grating and a photoreceptor surface to provide focusing and scan linearity correction to the scan line.

4 Claims, 2 Drawing Sheets

ROS PRINTER INCORPORATING A VARIABLE WAVELENGTH LASER

BACKGROUND OF THE INVENTION AND MATERIAL DISCLOSURE STATEMENT

The present invention is directed toward a raster output scan (ROS) printer and more particularly to a digital printer in which the scanning beam is produced by directing a variable wavelength output of a laser diode through a dispersive element.

Modern raster scan printers typically consist of a laser light source, a modulator, a beam deflector, an optical system of lenses and mirrors, a xerographic marking engine and the electronics to control the printer operation. Of critical importance to these printers is the deflector which is used to create the raster output scan at the surface of the imaging member, usually a photoreceptor belt or drum. Several deflection techniques are known in the art. An electrooptical system is disclosed in U.S. Pat. No. 4,450,459, where a laser output is directed across the full width of an electro-optic element. Individual electrodes are addressed to produce a diffraction pattern resulting in a beam of light sweeping across an image recording medium to produce a raster scan output. This type of prior art system has been found to be unsatisfactory for high resolution, high speed printing needs. Polygon scanning beam deflectors have come to be the preferred beam deflection element in most commercial ROS printers, due to its design simplicity and reliability at high scanning resolution and speed. U.S. Pat. No. 4,349,847 discloses a conventional polygon ROS type of printing system.

A polygon scanner has certain limitations and disadvantages. The polygon is typically mounted on a shaft driven at a high rotational speed by a motor. The scanner, especially at high speeds, is subject to motion (wobble) error which must be corrected for in the post-polygon optics. The bearing on which the polygon is mounted to the shaft is subjectto wear and this can result in a misalignment of the scan line at the image surface. It would be desirable to utilize a nonmechanical passive beam deflector if the high performance characteristics associated with the polygon scanner could be retained. The present invention is directed to such a ROS scanner which utilizes the wavelength varying output of a laser source in combination with a stationary light deflector, which, in a preferred embodiment, is a grating. The beam is diffracted from the grating as a function of the wavelength of the incident light. The diffraction angle varies over the wavelength range to produce an output beam which is focused at the image plane as a raster scan line. This concept of selectively varying the wavelength of laser output and directing the output to a dispersive element for scanning purposes is generally described in U.S. Pat. No. 4,250,465. There is also significant literature applied to different techniques of accomplishing wavelength scanning. For example, Filnski and Skettrup in an article entitled "Fast Dispersive Beam Deflectors and Modulators" (IEEEJ. Quantum Electronics, QE Vol. 18, No. 7, pg., 1059-1062 July, (1982) proposed electro-optic tuning of the output of a broadband laser and directing the output to a two dimensional scanner (prism). Examples of a tunable laser diode having wide wavelength scanning range are disclosed in an article by Mittelstein, et al. Applied Physics Letters 54, Mar. 20, 1988, 1092 and by Hall, et al. in an article entitled "Broadband Long Wavelength Operation" Appl. Phys. Lett., Vol. 58 No. 8 8, Aug. 21, 1989, pp 752-754.

While the prior art literature has provided suggestions for using the scanned output of the dispersive element in various applications (U.S. Pat. No. 4,250,465, col. 1, lines 11-16), there has been no exploration of the type of system necessary to enable a ROS scanner capable of forming high resolution scan lines at the surface of a photoreceptor belt or drum, e.g. high resolution high scan printing.

To enable a high resolution digital ROS printer using the variable wavelength tuning technique, the laser source must provide a tunable range of between 50 to 100 nm of the laser wavelength and the dispersive element must be able to provide up to 1000 resolvable spots per inch or 10,000/scan lines at the image surface. Further optics may be necessary for correction of any nonlinearity associated with the diffracted beam and compensation for varying spot size due to changing the effective aperture and length. According to the present invention, a high resolution ROS system is accomplished by utilizing a scannable laser within an external resonator cavity. The laser, a diode laser in the preferred embodiment, is made to operate in a single longitudinal mode of the external resonator from among the plurality of longitudinal modes that can exist for the laser of a given length and spectral bandwidth of the gain medium. The laser wavelength is scanned through the longitudinal modes of the laser. This is referred to as a "digital scanner" because only discrete wavelengths, hence spot positions in the image plane, are allowed by the fixed laser cavity length. Scanning the laser wavelength steps sequentially through the longitudinal modes. An expanded output beam is diffracted along a scan path by a high resolution grating and focused as a scan line on the image plane by a scan lens designed to correct for the distortional effects introduced by the grating. More particularly, the invention is directed to a digital scanning laser printer for forming high resolution scan lines at a photosensitive image medium comprising: a broad-band wavelength tunable laser source operational in a plurality of longitudinal modes to provide an output beam of radiation whose wavelength varies incrementally over the tunable range, a laser cavity within which said laser source is positioned, said cavity having a length L given by the expression $$L = \lambda^2 / 2n(FSR)$$

where FSR is the scan line pixel spacing, n is an integer and $\lambda$ is the laser source operating wavelength, a diffraction grating in the path of said output radiation beam, said grating adapted to diffract said incident radiation as a function of its wavelength to produce an output beam which scans across a diffraction angle, and a scan lens positioned between the photosensitive imaging plane and the grating, said scan lens adapted to focus the scanned diffracted beam unto a scan line of the photosensitiveimage medium while correcting for distortion and nonlinearity caused by the grating.

DESCRIPTION OF THE INVENTION

Figure 1:
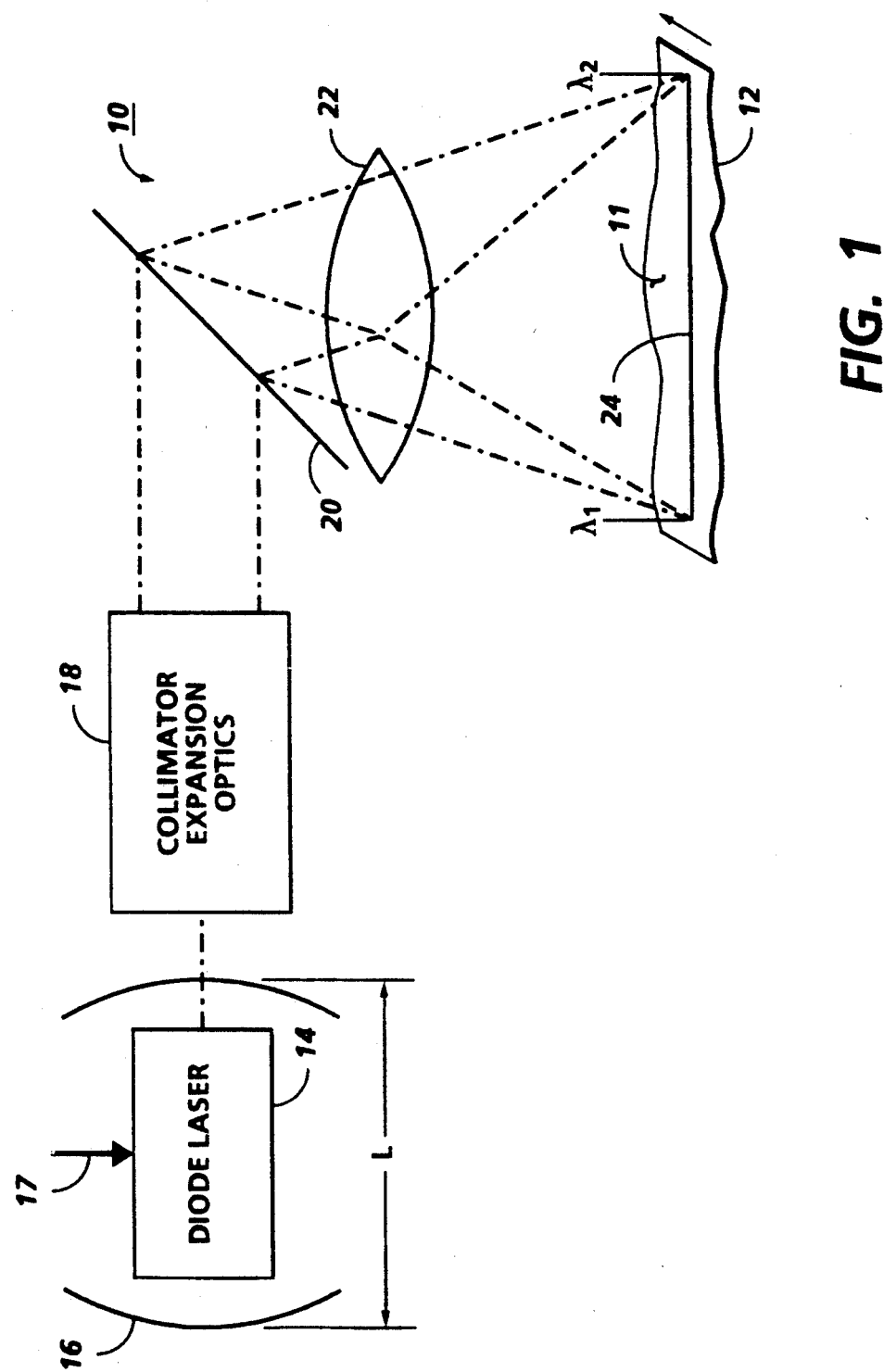
FIG. 1 shows a ROS printer optical system incorporating a wavelength tunable diode laser and scan and correction optics of the present invention.

FIG. 1 shows, a perspective view of a raster output scan (ROS) printer 10 operating at a high scanning rate to produce a high resolution scan line at the surface 11 of a photoreceptor belt 12 moving in the direction of the arrow. The system comprises a wavelength tunable diode laser 14 located in a laser cavity 16. The laser is self-modulating in accordance with input data signals 17 representing individual image data (referred to hereafter as "pixels"). The laser is operated in a single multi-longitudinal mode to provide outputs whose wavelengths vary in a 50-100 nm range. The laser outputs are collimated and expanded by conventional collimation-/expansion optics 18 and directed to a dispersion element 20 which, in a preferred embodiment, is a high resolution diffraction grating. Element 20 diffracts the incident beam through an angle $\beta$ whose magnitude is determined by the wavelength of the incident beam. Element 20 in effect changes the wavelength scan of the laser into a one dimensional spatial scan providing a physical separation of one wavelength from another. The diffracted beam is corrected for distortion and spot size variation by an F $\beta$ lens element 22 and is then focused as a scan line 24 at the surface of belt 12.

According to the first aspect of the present invention, laser 14 is an ALGaAs quantum well diode operating with a 100 nm tuning range at a nominal (free-running) wavelength of 800 nm. The laser is adapted to operate in over 10,000 longitudinal modes. A laser of this general design may be constructed according to disclosures set forth, for example, in the Mittelstein reference (supra) and in the laser design described in an article entitled "Semiconductor Quantum Well Window Lasers", by Scifers and Burnham, Xerox Disclosure Journal, Vol. 10, No. 6, November–December 1985, pages 383-388. The contents of both references are hereby incorporated by reference. Laser 14 is located within a resonator cavity 16 whose length L, according to a first aspect of the present invention, is selected so that each longitudinal mode corresponds to one pixel of input data. A correspondence is made between each picture element (pixel) in the image plane and each longitudinal mode of the laser within the scan range determined by the gain bandwidth. Therefore, neighboring longitudinal modes of the laser correspond to neighboring pixels in the image plane. The laser gain spectral width $\Delta\lambda_G$ is divided by the number of pixels desired in the image plane Np to give the desired free spectral range for the laser.

$$\frac{\Delta\lambda_G}{Np} = FSR \quad (1)$$

The required length L of the laser is then calculated as:

$$L = \lambda^2 / 2n(FSR) \quad (2)$$

where FSR (free spectral range) is the scan-line pixel spacing, $\lambda$ is the laser wavelength, and n is the refractive index, (for air, n = 1). Derivation of a representative L is given below in the example.

EXAMPLE

As an example, a ROS system is designed to have the following specifications: the scan width at the image plane is 14 inches (35.6 cm), scan resolution is 600 spi (8400 resolvable spots) with average spot size in the image plane of 42 $\mu$m, and each pixel spaced in wavelength by 0.01 nm. The laser diode cavity is designed to have a length L which is derived from equation 2. For an AlGaAs diode laser, $\lambda = 800$ nm, FSR has been set as a design parameter at 0.01 nm, and n = 1, therefore, $$L = (800 \ nm)^2 / (2(0.01 \ nm)^1) = 32 \ mm$$

It is apparent that by varying wavelength L of the cavity, more or less resolvable spots may be obtained at the scan line.

Figure 2:
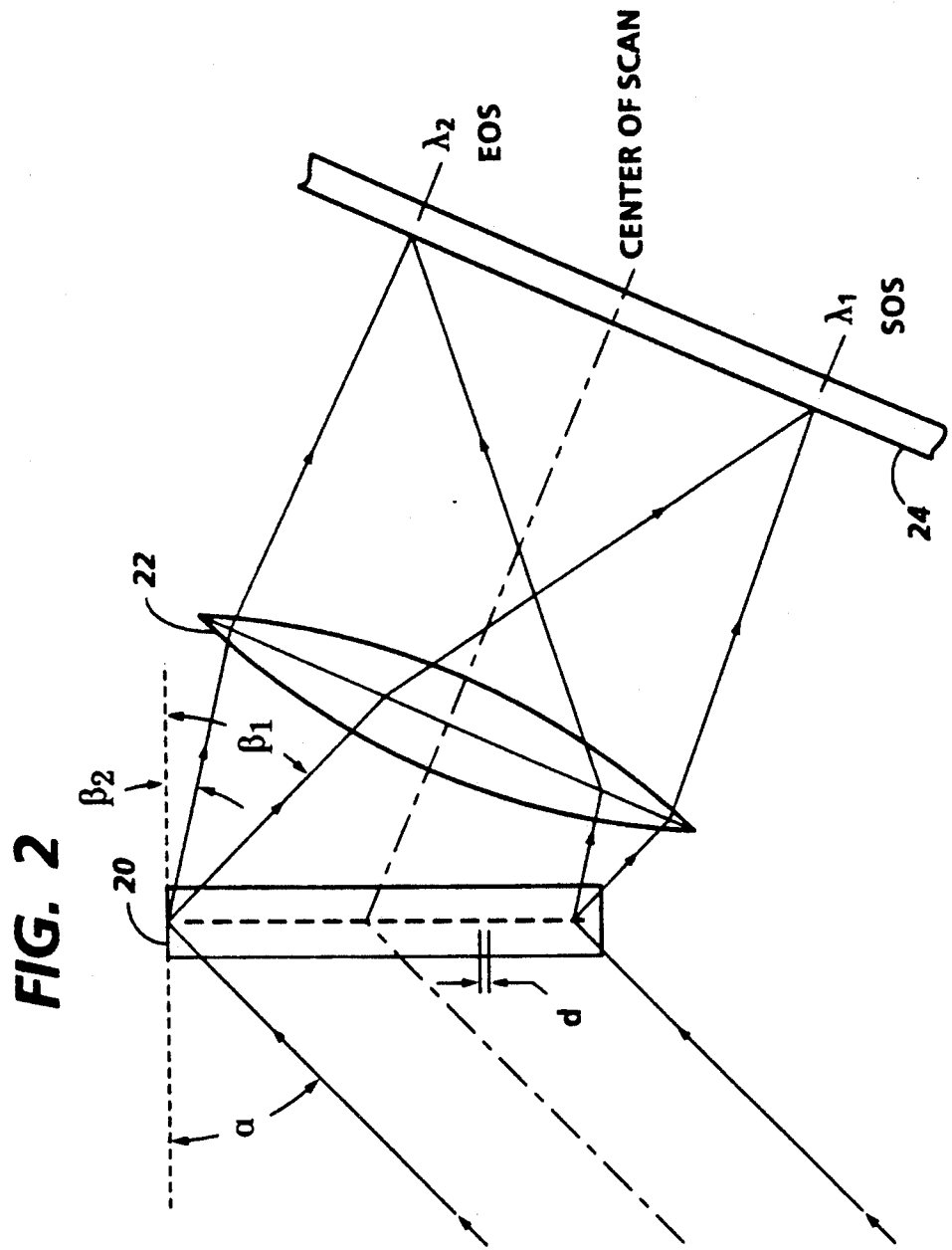
FIG. 2 shows a top view of a portion of the scan optics including the diffraction grating and a scan lens.

Referring to FIG. 2, the grating must be able to diffract the incident beam to provide the spatial scanner resulting in a scan line with a desired resolution and spot size and spacing. The grating will diffract the incident beam into a plurality of beam orders according to the expression:

$$\sin \beta = m\lambda/d - \sin \alpha \quad (3)$$

where $\alpha$ is the incidence angle of the laser beam measured normal to grating 10, $\beta$ is the diffraction angle measured from the normal to grating 10 which varies between $\beta_1$ (start of scan (SOS), and $\beta_2$ (end of scan (EOS) value. $\lambda$ is the instantaneous wavelength of the energy beam, m is the order 0, 1, 2, etc., and d is the spacing of the grating line.

Grating 20 has an angular deflection per unit wavelength given by the expression:

$$\frac{db}{d\lambda} = \frac{m}{d\cos\beta} \quad (4)$$

and a resolution given by the expression:

$$\frac{\Lambda}{\Delta\Lambda} = mn \quad (5)$$

An approximate expression for the wavelength shift width is $$\Delta\beta = \frac{m}{d\cos\beta} \cdot \frac{\Lambda^2}{2nd}$$

Where $\beta = \sin^{-1}\left(\sin\alpha - \frac{m\Delta}{d}\right)$

This equation describes the angular deflection per mode hop of the laser as a function of the wavelength. Both grating dispersion and the FSR dispersion lead to an increase in the deflection per mode hop to longer wavelength. Therefore, the scan lens must be designed to correct this scan non-linearity.

For a preferred embodiment, M = 1, d = 0.5, and a = 45°, $\lambda$ varies between 750 and 850 nm; e.g. between $\lambda_1$ and $\lambda_2$ in FIG. 1, $\beta_1 = 52°$, $\beta_2 = 20°$. Selection of M = 1 is generally preferred since the energy of the first order beam is greater than in the higher order beams.

Referring still to FIG. 2, scan lens 22 must focus the beam diffracted by grating 20 as a laser scan line 24, at an average spot size of 42 nm. For the system shown, the focal length of lens 22 =

$$FL = {}^u/_{\lambda d} = {}^{2.5 \times 42}/_{0.5} = 51.7'' \ (132 \ cm) \quad (6)$$

Although scan lens 22 is shown as a single element, it may be a multiple element lens.

An important distinction in the function of the lens 22 over that of the prior art fθ lens used with the polygon scanner, is the nature of the distortion to be compensated for. In the prior art, an fθ lens linearized the scan line by correcting for tan θ barrel type distortion errors. In the present system, fθ lens 22 must linearize the scan to compensate for the y cos β distortion created by the dependence of the dispersion equation.

While the invention has been described with reference to the structure disclosed, it will be appreciated that numerous changes and modifications are likely to occur to those skilled in the art, and it is intended to cover all changes and modifications which fall within the true spirit and scope of the invention. For example, the laser may be a dye laser, or an Alexandrite solid state laser.

What is claimed is:

1. A digital scanning laser printer for forming high resolution scan lines at a photosensitive image medium comprising:

a broad-band wavelength tunable laser source operational in a plurality of longitudinal modes to provide a beam of radiation whose wavelength varies incrementally over the tunable range, a high resolution diffraction grating in the path of said output radiation beam, wherein the radiation beam is incident to the grating at an angle $\alpha$ measured normal to the grating, said grating diffracting said output beam of radiation through an angle $\beta$ the magnitude of $\beta$ being determined by the wavelength of said beam of radiation, to produce an output beam which scans across a diffraction angle, and a scan lens positioned between the photosensitive imaging medium and the grating, said scan lens focusing the diffracted beam onto the image medium as a linearized scan line comprising a plurality of neighboring pixels with uniform inter-pixel spacing corrected for distortion and spot size variations.

2. The printer of claim 1 wherein said laser source is operated within a resonator cavity, the cavity enclosing a medium with a characteristic index of refraction and the cavity having a length L given by the expression $$L\ (nm) = \lambda^2 / 2n(FSR)$$

where

FSR is the value of the scan line inter-pixel spacing expressed in nm, n is the index of the resonator cavity medium and $\lambda$ is the laser operating wavelength, in nm.

3. The printer of claim 1 wherein said grating is formed with a plurality of ruled, parallel lines, each line spaced apart by a distance d and wherein said grating diffracts said output beam of radiation into a plurality of beam orders according to the expression $\sin \beta = m\lambda/d - \sin \alpha$ where $\lambda$ is the instant wavelength of the radiation beam and m is the order.

4. The printer of claim 1 wherein said laser source is a diode laser.

* * * * *